UNITED STATES PATENT OFFICE.

ALFRED N. OVERTON, OF KNOXVILLE, IOWA.

IMPROVEMENT IN COMPOSITIONS TO BE APPLIED TO GRAIN TO PREVENT SMUT.

Specification forming part of Letters Patent No. 33,400, dated October 1, 1861.

*To all whom it may concern:*

Be it known that I, ALFRED N. OVERTON, of Knoxville, in the county of Marion and State of Iowa, have invented a new and useful Compound for Removing Smut from Grain, and which I call a "Smut Exterminator or Preventative;" and I do hereby declare that the following is a full, clear, and exact description of the same.

The object of this invention is to thoroughly cleanse or exterminate the smut of seed-grain, so that the grain springing therefrom will be entirely free from smut; and it consists in the use of a mixture of blue-vitriol and common salt, which is prepared in a peculiar manner to effect that object.

To enable others skilled in the arts appertaining to my invention to make and use the same, I will proceed to describe its composition and the manner of its application with reference, for example, to cleaning a bushel of grain.

One-quarter of a pound of blue-vitriol; one-quarter of a pound of common salt. The above ingredients are thoroughly pulverized and mixed together and put into an iron vessel, in which they are subjected to a dry heat of about 200° for an hour, at the expiration of which time they will have combined and changed in color to a bright green. This mixing and heating operation has been found necessary in practice to make the composition of a uniform strength, and to cause it to be more readily dissolved for use, besides effecting the peculiar chemical change in the character of the composition that is indicated by the change in color.

After having mixed and heated the above amount of ingredients in the manner described, it is dissolved in ten gallons of tepid water. The bushel of wheat or other grain is then put into the solution and thoroughly stirred until all the smut and other filth have separated and floated to the top. It should be stirred and skimmed until no more smut rises to the surface. The grain is then removed, and should be sown, if possible, while still damp.

Any other quantity of grain may be cleaned in the same way, with a proportional quantity of vitriol and salt prepared and applied in the same manner.

This method of exterminating and preventing smut has been thoroughly tested, and in no instance has there been any smut in the grain grown from seed thus-treated. When seed prepared according to this invention has been sown side by side with ordinary uncleaned seed the grain from the latter has been smutty, while that from the former has invariably been free from smut.

I claim as my invention and desire to secure by Letters Patent—

The composition of blue-vitriol and common salt, prepared in the manner described, for the purpose of exterminating and preventing smut.

ALFRED N. OVERTON.

Witnesses:
A. B. MILLER,
H. MANNERS.